(12) United States Patent
Kashler

(10) Patent No.: US 11,092,075 B2
(45) Date of Patent: Aug. 17, 2021

(54) HIGH-CAPACITY ELECTRIC ENERGY STORAGE SYSTEM FOR GAS TURBINE BASED POWER PLANTS

(71) Applicant: New York Power Authority, White Plains, NY (US)

(72) Inventor: Yefim Kashler, Astoria, NY (US)

(73) Assignee: New York Power Authority, White Plains, NY (US)

( * ) Notice: Subject to any disclaimer, the term of this patent is extended or adjusted under 35 U.S.C. 154(b) by 0 days.

(21) Appl. No.: 16/672,707

(22) Filed: Nov. 4, 2019

(65) Prior Publication Data
US 2021/0131349 A1 May 6, 2021

(51) Int. Cl.
*F02C 1/05* (2006.01)
*F02C 6/16* (2006.01)
*F02C 7/08* (2006.01)
*F02C 6/18* (2006.01)

(52) U.S. Cl.
CPC ............... *F02C 6/16* (2013.01); *F02C 1/05* (2013.01); *F02C 6/18* (2013.01); *F02C 7/08* (2013.01)

(58) Field of Classification Search
CPC ...... F02C 6/16; F02C 1/05; F02C 6/18; F02C 7/08
See application file for complete search history.

(56) References Cited

U.S. PATENT DOCUMENTS

| | | | |
|---|---|---|---|
| 5,930,990 A * | 8/1999 | Zachary | F02C 3/305 60/39.53 |
| 8,196,907 B2 * | 6/2012 | Zhang | F02C 7/1435 261/116 |
| 8,286,431 B2 * | 10/2012 | Briesch | F02C 6/18 60/728 |
| 2007/0240400 A1 * | 10/2007 | Smith | F02C 7/08 60/39.182 |
| 2010/0146930 A1 * | 6/2010 | Motakef | F02C 7/047 60/39.182 |
| 2010/0287981 A1 * | 11/2010 | Chen | C01B 3/48 62/619 |
| 2013/0167548 A1 * | 7/2013 | Popovic | F02C 7/16 60/772 |

* cited by examiner

*Primary Examiner* — Shafiq Mian
(74) *Attorney, Agent, or Firm* — Bond Schoeneck & King, PLLC; George McGuire

(57) ABSTRACT

Power output and thermal efficiency of combustion turbine depend on the compressor inlet air temperatures. The lower the temperature, the higher is the power output and thermal efficiency. This system employs a gas turbine in a simple or combined cycle configuration for electrical power generation with an air inlet receiving chilled air. Air is chilled using a plurality of interconnected channels containing a fluid and comprising a plurality of coils, an ambient air inlet in fluid communication with the plurality of coils, a chiller unit, an accumulator tank with an at least one entrance and an exit in fluid communication with the plurality of interconnected channels; a pump, shutoff valves, and a control valve. The electric energy storage system has a charging and discharging cycles.

18 Claims, 5 Drawing Sheets

HIGH-CAPACITY ELECTRIC ENERGY STORAGE SYSTEM FOR GAS TURBINE BASED POWER PLANTS

FIELD OF THE INVENTION

The present invention relates to electric energy storage at electric power generation plants. More specifically, for electric energy storage with simultaneous plant thermal efficiency improvement at gas turbine based power plants.

BACKGROUND

Electrical grid power supply must match the demand for energy at all times despite the continuously fluctuating daily and seasonal demand. Over the last years this challenging task has become even more difficult with vast deployment of the non-dispatchable renewable energy sources, such as solar and wind power generation. Power production from those sources cannot be scheduled and coordinated with the electrical grid demand due to unpredictability of weather conditions. In many regions the power market has become unstable due to oversupply of the non-dispatchable power during low demand, and undersupply during high demand. Therefore, energy storage has become a critical task for the power generators and independent electric grid operators (ISO's).

According to the U.S. Energy Information Administration, in 2018, a total of 4,178 billion kWh of electric energy was generated in the U.S. Of that amount, 35.1% or 1,468 billion kWh was generated from natural gas. Of that energy, 81% or 1,189 billion kWh was generated by combustion turbines or combined cycle plants. Total installed U.S. natural gas fired capacity amounts to 460 GW.

A number of large battery banks have been built in recent years to store very limited amounts of electrical energy. Electric energy battery based storage projects are usually associated with large capital costs, hazardous chemicals, low reliability, fire hazard and relatively short life cycle. Additionally, they usually have large footprints and the costs of the battery based energy storage systems are close to a $1,000/kWh.

A proven method to "store" electric energy is hydroelectric pumped storage projects. These projects "store" electrical energy by means of reversing a hydroelectric turbine in order to pump water to a large upper water reservoir during low-energy demand periods and generate power in a hydro turbine by reversing flow during the high demand periods. These projects also help equalizing the daily energy demand curve. However, geographical location, terrain, available water resources, and costs limit the application of these projects. Additionally, net generation of such plants is always negative, as more energy is used to pump the water than is produced during the energy generation cycle.

Gas turbine power output is highly sensitive to the compressor inlet air temperature. To increase gas turbine output during hot ambient air conditions, inlet air cooling is employed at a number of installations. Those installations may use evaporative coolers, so-called "fogging" systems, both of which can cool the inlet air close to the "wet bulb" temperature. Deeper cooling can be achieved with mechanical or absorption chillers, which would allow gas turbine to provide even higher power output. Those chillers, however, consume significant amount of electrical power in case of the mechanical chillers, or steam in case of the absorption chillers. Both chiller technologies negatively offset the effect of the power output increase and reduce the plant net power output.

To mitigate variable daily demand for power, as well as to accommodate the unpredictable energy generated by non-dispatchable renewable energy sources gas turbine based plants have to operate at reduced electrical load or completely cycle offline. Operation at reduced load inevitably causes reduction in plant thermal efficiency. A typical combined cycle plant operated at minimum load while still maintaining its compliance with permitted air emissions limits loses up to 25% of its efficiency, which means that fuel consumption per each kWh of generated power is increased by the same amount. Shutting off such plants would also cause inefficient fuel use during frequent startups and shutdowns. Cycling plants are also experiencing high failure rates and incurring significantly increased maintenance costs due to the fact that the main power generation equipment is usually designed for steady-state operation, not cycling.

BRIEF SUMMARY

In order to accommodate the aforementioned issues, gas turbine based plants need to have electric energy storage and must be able to run more efficiently. In various examples described herein an example of this system, electric energy storage is achieved by means of storing cold media during low-energy demand periods and releasing the cold media to cool gas turbine inlet air during high energy demand periods, thereby increasing the density of the air and mass flow through the gas turbine. Thermal efficiency improvement is simultaneously achieved by allowing the gas turbines to operate at higher loads and closer to the design efficiency points during low-energy and high energy demand periods.

To shift electric energy production at simple or combined gas turbine cycles from low demand periods to high demand periods, high-capacity electric energy storage system for gas turbine based power plants is introduced. Various examples described herein employ a gas turbine in a simple or combined cycle configuration for electrical power generation, a gas turbine inlet air chilling system, chilled fluid/ice storage accumulator tank, circulating pumps, shutoff and control valves, and connecting piping. This system achieves a goal of electrical energy storage by means of shifting gas turbine colder inlet air temperatures from low-energy demand periods, e.g., at night, to high energy demand, e.g., periods, hot day peak periods, by means of thermal energy storage. Corresponding thermal efficiency improvement is achieved by allowing the gas turbines to operate at higher loads and closer to the design efficiency points during both low-energy and high energy demand periods.

For example, during low-energy demand periods, the chiller system chills water or any other cooling fluid inside the accumulator tank to lower temperatures. During high-energy demand, especially hot summer days, the cold fluid/ice stored in the accumulator tank is used to lower inlet air temperature of the combustion turbines, therefore increasing the combustion turbine power output. In case of the combined cycle application, this system is used in conjunction with a steam generator and further increases plant power output due to the steam turbine power output increase. Plant thermal efficiency increases during low demand periods when plant would run at higher loads to power the chillers, and high demand periods when the plant runs at colder inlet air temperatures at base loads.

These and other features will become readily apparent upon further review of the following specification and drawings.

BRIEF DESCRIPTION OF THE DRAWINGS

The various examples described herein will be more fully understood and appreciated by reading the following detailed description in conjunction with the accompanying drawings, in which.

Similar reference characters denote corresponding features consistently throughout the attached drawings.

DETAILED DESCRIPTION

Figure 1:
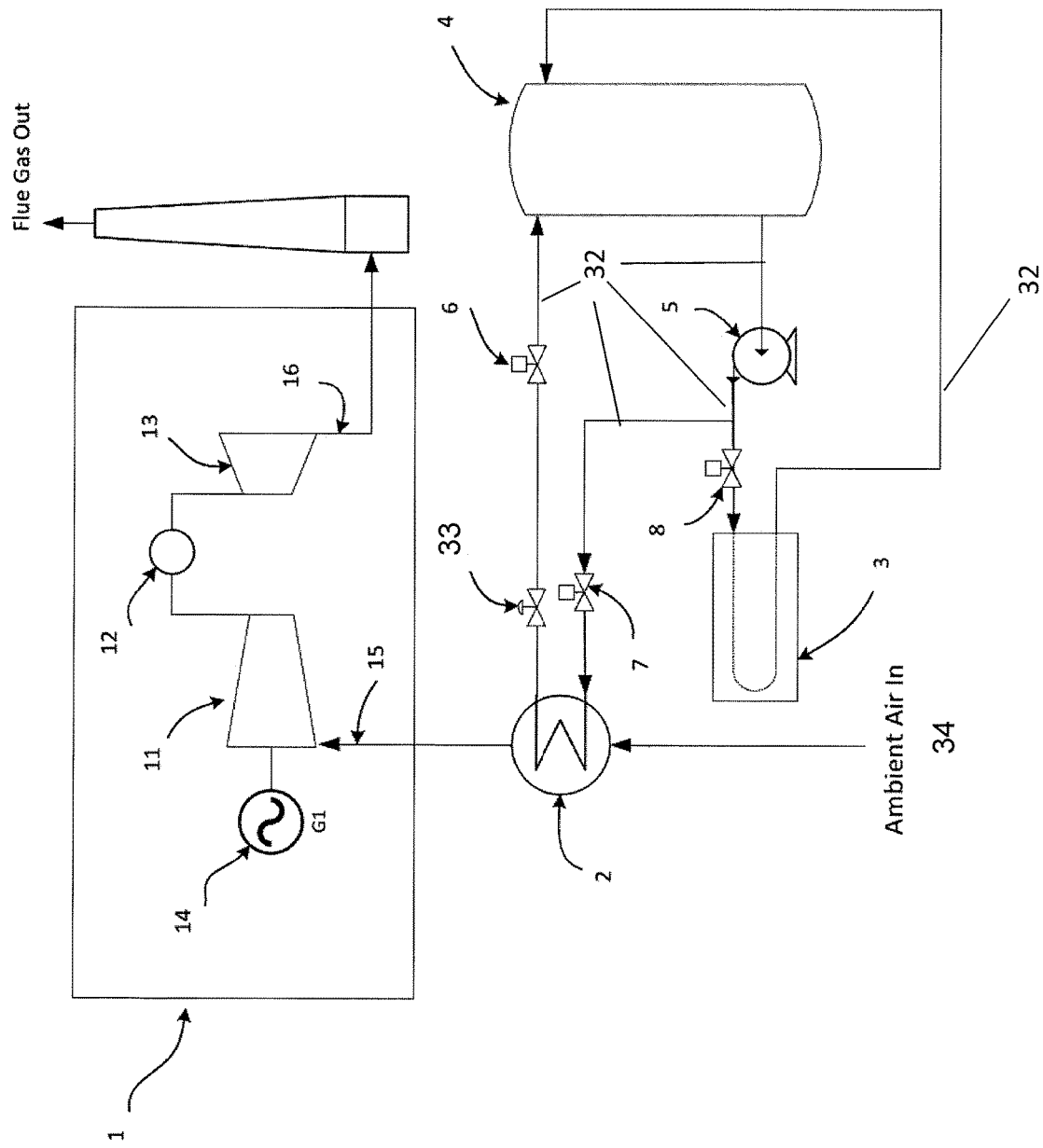
FIG. 1 is a schematic diagram of an example of a high-capacity electric energy storage system for gas turbine based power plants in a simple cycle configuration.

In FIG. 1 there is shown a schematic diagram of an example of a high-capacity electric energy storage system for gas turbine based power plants in a simple cycle configuration. This example comprises gas turbine 1, chilling coils 2, a chiller unit 3, an accumulator tank 4, a circulating pump 5, shutoff valves 6, 7 and 8, an ambient air inlet 34, a plurality of interconnected channels 32, and a control valve 33.

In the example shown, gas turbine 1 is comprised of an air inlet 15 which is in air communication with a compressor 11, a combustor 12, a power turbine 13, an electric power generator 14, and an air exhaust 16. The efficiency of the gas turbine 1 can be correlated to the temperature of the air that comes in through the air inlet 15. A lower temperature of air increases the density of the air and mass flow through compressor 11 of the gas turbine 1 and therefore increases the efficiency.

The plurality of interconnected channels 32 contain a fluid and is comprised of a plurality of chilling coils 2. These coils allow to cool ambient air going to the gas turbine compressor by using cold fluid from the accumulator tank. The channels 32 allow the fluid to flow between the different parts of the system. (These channels 32 can be made of any type of piping suitable in the art. The fluid can be water, ice slurry or other suitable cooling fluid. The chiller unit 3 is positioned such that one of the channels 32 runs through the chiller unit 3. The chiller unit 3 lowers the temperature of the fluid inside the accumulator tank 4 and channels 32. The chiller unit 3 can be of mechanical or absorption type. In one example, the chiller unit 3 is a mechanical compression chiller unit and is powered by the electric power generator 14, or an external source.

The ambient air inlet 34 is in fluid communication with the plurality of chilling coils 2. When the chilling coils 2 contain fluid that is chilled, the temperature of the ambient air can be lowered. The chilling coils 2 can operate as recuperative heat exchanging coils. The turbine inlet air can be brought to a lower temperature by other mechanisms such as a direct contact evaporative method, spray type heat exchanger method, or fogging type heat exchanger method. The ambient air can be moved over the chilling coils 2 by suction from the gas turbine compressor 11.

In the example in FIG. 1, there is shown an accumulator tank 4 with two entrances and an exit. In this example, the two entrances are on the upper portion of the accumulator tank 4 and are in fluid communication with the channels 32. One of the entrances allows the one of the channels 32 to deposit fluid or ice slurry that has been chilled by the chiller unit 3 into the accumulator tank 4. The other entrance allows one of the channels 32 to deposit fluid that has gone through the chilling coils 2 into the accumulator tank 4. The exit is positioned on the lower portion of the accumulator tank 4. The exit is in fluid communication with the channel 32 that flows to the circulating pump 5. The accumulator tank 4 can be insulated with thermal insulation to extend the time of energy storage.

The circulating pump 5 can circulate fluid within the channels 32 from the exit of the accumulator tank 4 through the chiller unit 3 or to the chilling coils 2. Fluid that is at a first temperature can be lowered to a second temperature by the chiller unit 3. The fluid that is at a second lower temperature can then be pumped into the accumulator tank 4 from there it can be pumped to the chilling coils 2. The chilling coils 2 can then lower the temperature of the ambient air as discussed above.

The plurality of interconnected channels 32 further comprise a first shutoff valve 7, a second shutoff valve 6, and a third shutoff valve 8. The first shutoff valve 7 can be positioned between the circulating pump 5 and the chilling coils 2. The second shutoff valve 6 can be positioned between the chilling coils 2 and the accumulator tank 4. The third shutoff valve 8 can be positioned between the circulating pump 5 and the chiller unit 3. Each shutoff valve can move between an open and closed position. The shutoff valves can control the flow of water depending on whether the shutoff valve is opened or closed.

In the example, there is a control valve 33 located between shutoff valve 6 and shutoff valve 7. The control valve 33 can have pneumatic or electric actuator. The control valve 33 can also have a positioner or other elements which would allow the valve to automatically go to any desired position based on a process demand. The control valve 33 can enable the stored electric energy to be dispatched precisely and quickly per the market demand. Fast electric market response is necessary in the electric industry. In this example, the release of the stored energy can be in a matter of seconds, as opposed to much longer response for other methods and technologies.

The accumulator tank 4 being a key element of the energy storage can have a charging cycle and a discharging cycle. The charging cycle can take place during low-energy demand periods. In the charging cycle the chiller unit 3 can cool the fluid in the channels 32 to produce chilled fluid or ice slurry, which can then be pumped into the accumulator tank 4 by pump 5. In the charging cycle shutoff valve 8 is open, while shutoff valves 6 and 7 are closed. The discharging cycle can take place during high-energy demand periods. The chilled fluid or ice slurry can be discharged from the exit of the accumulator tank 4 via open shutoff valves 6 and 7, while shutoff valve 8 is closed. During the discharging cycle the chilled fluid or ice slurry can be pumped to the chilling coils 2 to lower the temperature of the ambient air. The chilled ambient air is then sucked into the compressor 11 of the gas turbine 1 via the air inlet air 15 to generate additional power in generator 14. The amount of stored energy is determined by the temperature in the accumulator tank 4 and its volume. During a typical hot summer day, the energy storage capacity could amount to 20-25% of the rated power plant output.

Figure 2:
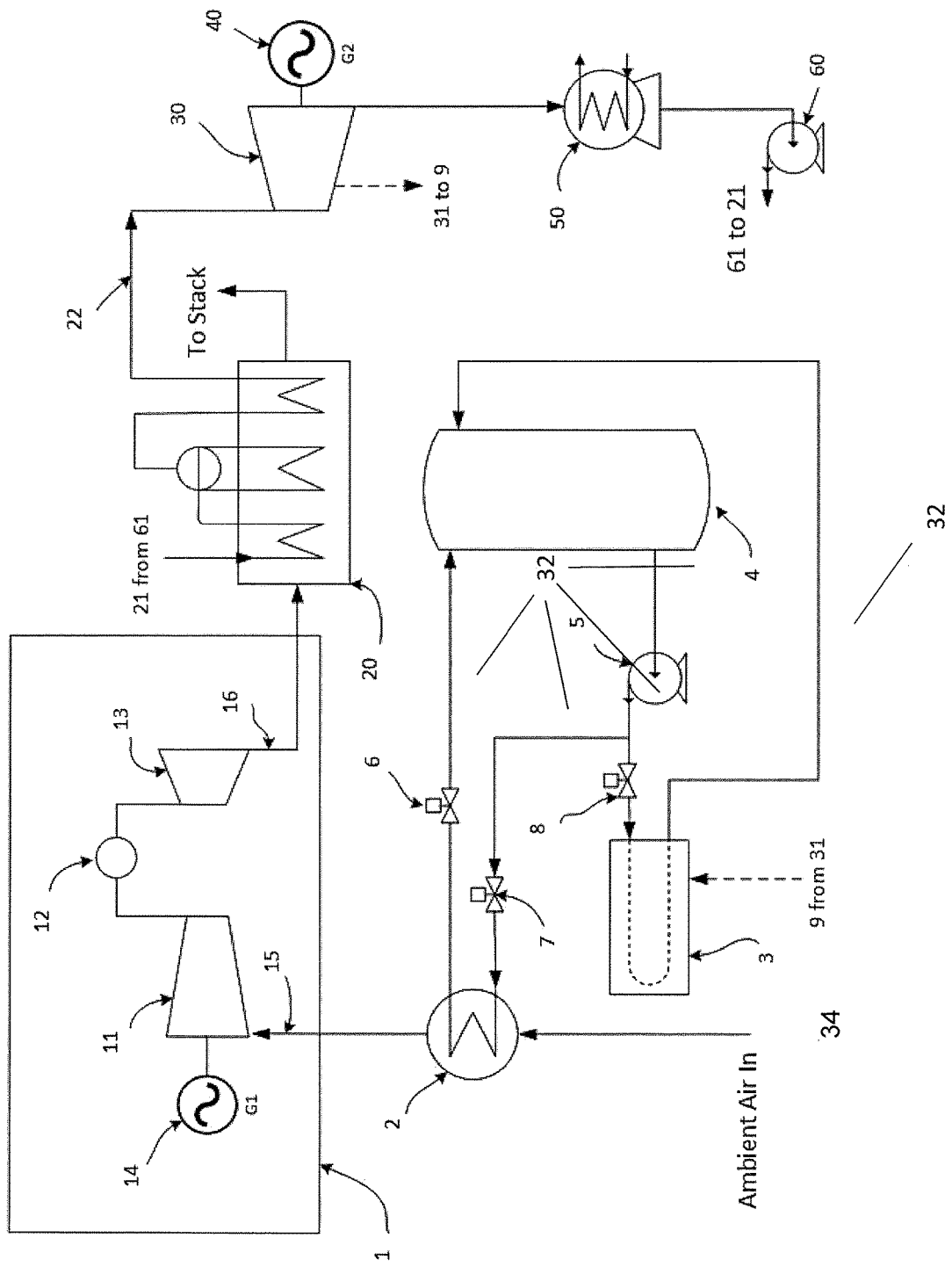
FIG. 2 is a schematic diagram of an example of a high-capacity electric energy storage system for gas turbine based power plants in a combined cycle configuration.

Referring to FIG. 2, there is shown a schematic diagram of an example of a high-capacity electric energy storage system for gas turbine based power plants in a combined cycle configuration. In this example, the components of the simple cycle high-capacity electric energy storage system for gas turbine based power plants depicted on FIG. 1 are shown, as well as a Heat Recovery Steam Generator (HRSG) 20, a steam turbine 30, a second electric power generator 40, a condenser 50, and pump 60.

In this example, the flue gas exhaust 16 from the gas turbine 1 is directed to the HRSG 20. The flue gas exhaust 16 can expel the gas from the gas turbine 1 to the HRSG 20, wherein the HRSG 20 uses the air to convert water into superheated steam 22. The HRSG 20 also comprises a condensate inlet 21. Superheated steam 22 moves to the steam turbine 30 and can then be used to power the steam turbine 30. The steam turbine 30 drives a second electric power generator 40. If the chiller unit 3 is an absorption chiller, steam can be drawn from the steam turbine 30 via a steam extraction 31 and used as a heating medium to power the chiller unit 3.

In the example, the condenser 50 is also in communication with the steam turbine 30. Steam can leave the steam turbine 30 and can flow to the condenser 50. The steam can then be condensed into condensate. Pump 60 is in communication with the condenser 50 and the condensate inlet 21 of the HRSG 20. The condensate from condenser 50 can be pumped into the condensate inlet 21 of the HRSG 20.

Figure 3:
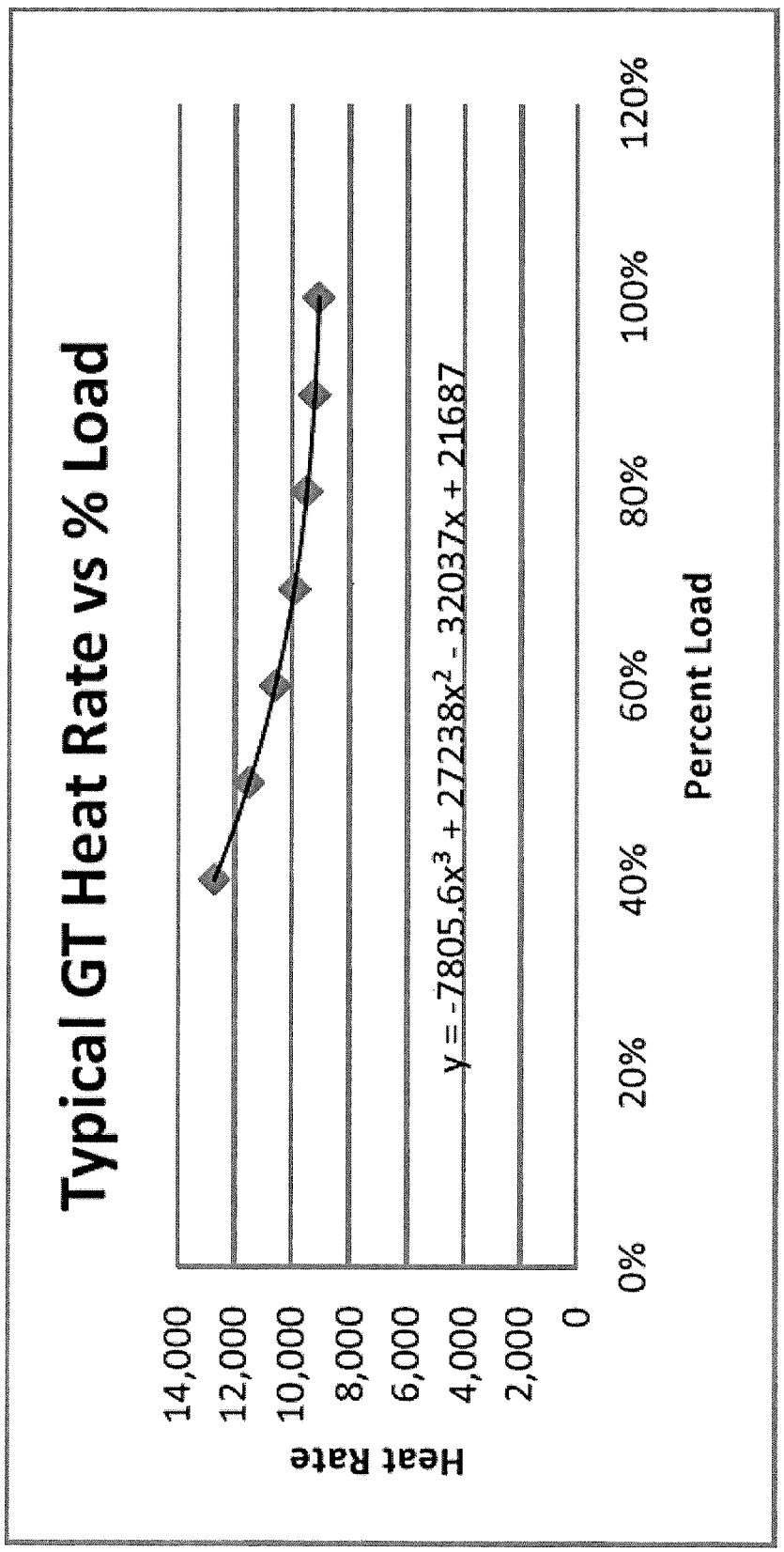
FIG. 3 is a graph that depicts typical gas turbine heat rate versus percent load.

Referring now to FIG. 3, there is shown a graph that represents typical gas turbine heat rate and percent load. Gas turbine output during low demand periods and the charging cycle is increased by the amount of power required to drive the chillers. Thus, the efficiency of the gas turbine simple or combined cycle is increased correspondingly because gas turbine is operating closer to the highest efficiency design base load conditions.

Figure 4:
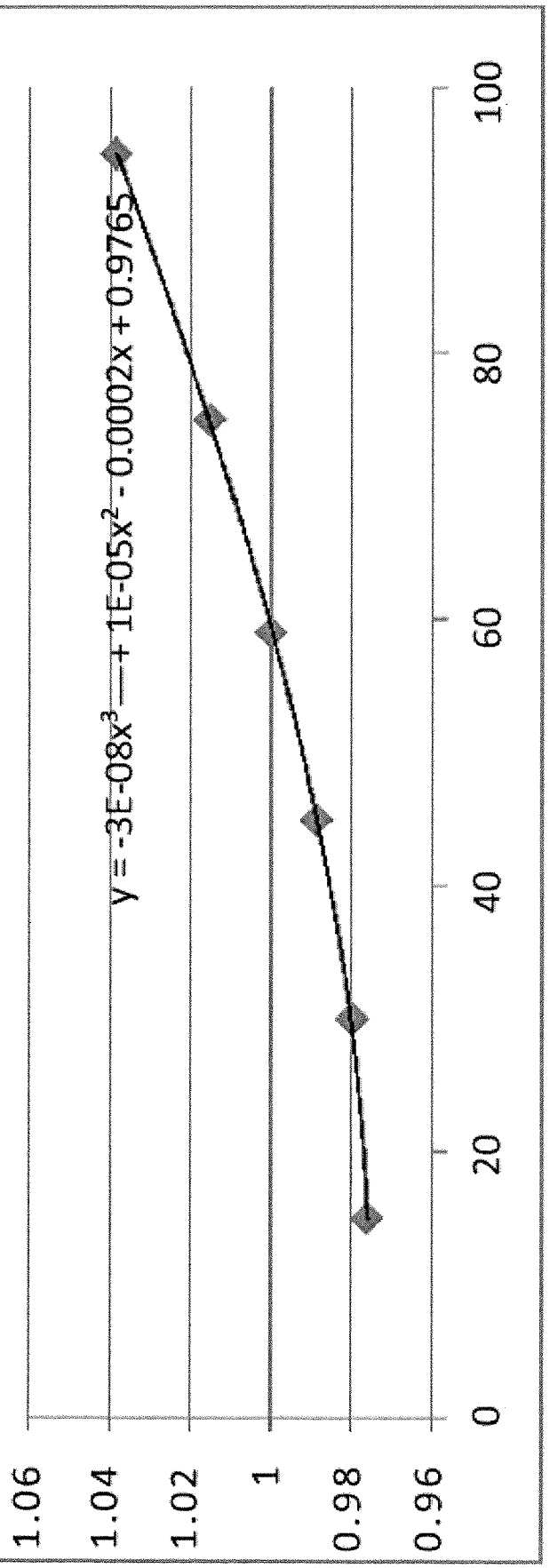
FIG. 4 is a graph that depicts typical gas turbine heat rate versus compressor inlet temperature.
Figure 5:
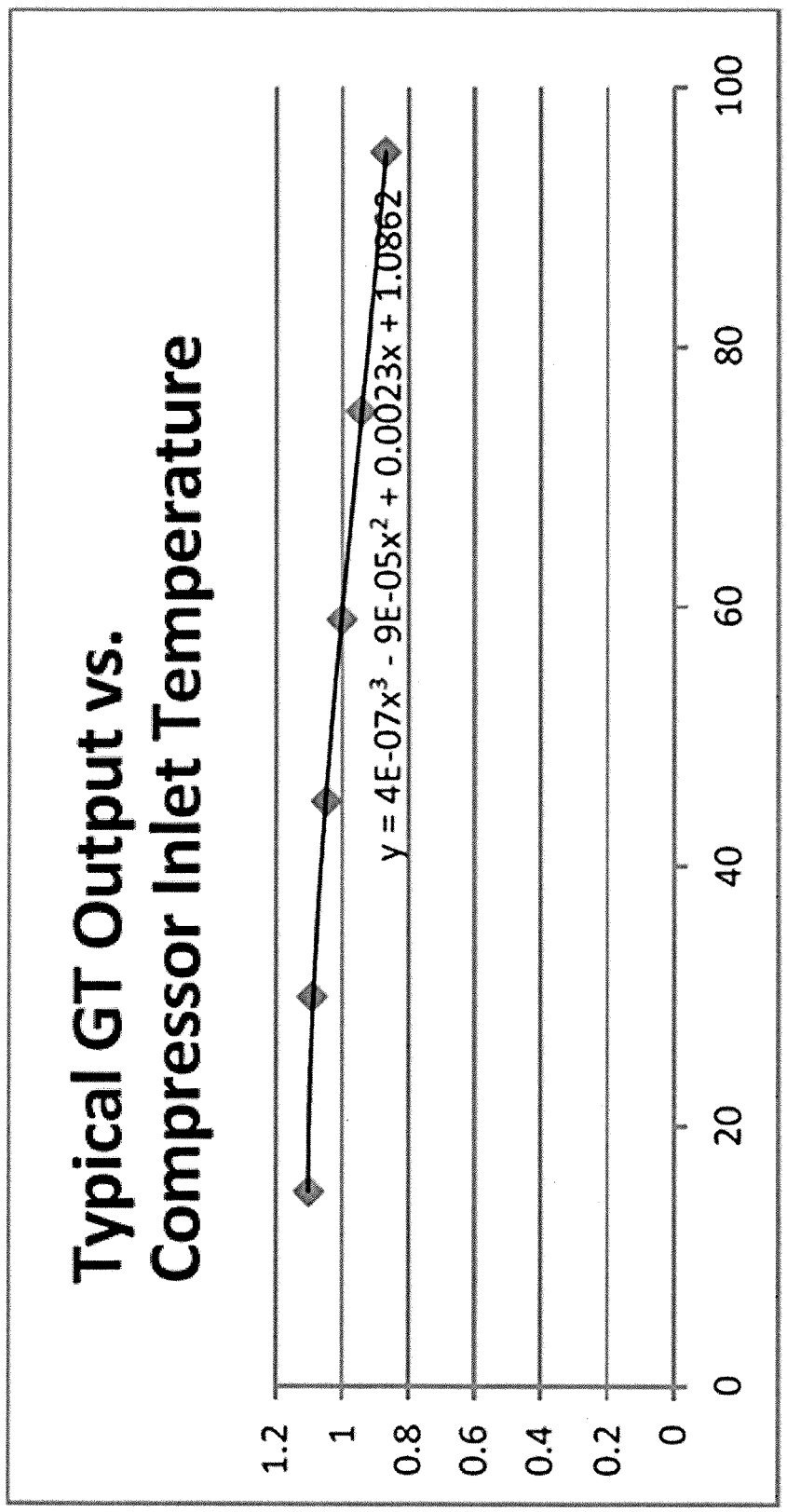
FIG. 5 is a graph that depicts typical gas turbine output versus compressor inlet temperature.

Referring now to FIGS. 4 and 5. In FIG. 4 there is shown a graph that represents typical gas turbine heat rate at various compressor inlet temperatures. Operation at lower inlet air temperatures during high-energy demand periods would also increase the plant efficiency. In FIG. 5 there is shown a graph that represents typical gas turbine output at various compressor inlet temperatures. Gas turbine output during high demand periods and the discharging cycle of the accumulator tank 4 is increased because the gas turbine is operating with colder inlet air.

Electric energy storage of up to 20% of the plant design output can be achieved by using an example of this system. An increase in power output during low-energy demand periods would mitigate the sharp reduction in energy efficiency. It is conservatively estimated that if an example of this system were to be used just at currently existing US power plants would amount to a potential of 69 GW of energy storage capacity and 62 billion kWh of stored energy at cost of only about 5% of the conventional battery energy storage.

It is to be understood that the present example is not limited to the embodiments described above, but encompasses any and all embodiments within the scope of the following claims.

What is claimed is:

1. An electric energy storage system, comprising:
    a plurality of interconnected channels containing a fluid and comprising a plurality of coils;
    an ambient air inlet in fluid communication with the plurality of coils;
    a chiller unit positioned such that one of the plurality of interconnected channels runs through the chiller unit;
    an accumulator tank with an at least one entrance and an exit wherein the at least one entrance and the exit is in fluid communication with the plurality of interconnected channels;
    a pump which is positioned such that it can circulate the fluid within the plurality of interconnected channels from the exit of the accumulator tank through the chiller unit and the coils wherein the fluid is at a first temperature and is then lowered to a second temperature by the chiller unit and the fluid is at the second lower temperature when going through the coils wherein the coils lower the temperature of the ambient air from the ambient air inlet;
    the plurality of interconnected channels further comprising a first shutoff valve, a second shutoff valve, and a third shutoff valve, the first shutoff valve positioned between the pump and the coils, the second shutoff valve positioned between the coils and the accumulator tank, and the third shutoff valve positioned between the pump and the chiller unit;
    the plurality of interconnected channels further comprising a control valve positioned between the second shutoff valve and the third shutoff valve; and
    a gas turbine comprising an air inlet in communication with an electric power generator and the coils.

2. The electric energy storage system of claim 1, the accumulator tank having a charging cycle and a discharging cycle.

3. The electric energy storage system of claim 2, wherein when the accumulator tank is in the charging cycle the first shutoff valve and the second shutoff valve are closed and the third shutoff valve is open and when the accumulator tank is in the discharging cycle the third shutoff valve is closed and the first shutoff valve and the second shutoff valve are open.

4. The electric energy storage system of claim 1, wherein the gas turbine further comprises a flue gas exhaust.

5. The electric energy storage system of claim 1, wherein the accumulator tank is insulated with thermal insulation.

6. The electric energy storage system of claim 1, wherein the chiller unit is driven by an electric motor.

7. An electric energy storage system, comprising:
    a plurality of interconnected channels containing a fluid and comprising a plurality of coils;
    an ambient air inlet in fluid communication with the plurality of coils;
    a chiller unit positioned such that one of the plurality of interconnected channels runs through the chiller unit;
    an accumulator tank with an at least one entrance and an exit wherein the at least one entrance and the exit is in fluid communication with the plurality of interconnected channels;
    a pump which is positioned such that it can circulate the fluid within the plurality of interconnected channels from the exit of the accumulator tank through the chiller unit and the coils wherein the fluid is at a first temperature and is then lowered to a second temperature by the chiller unit and the fluid is at the second lower temperature when going through the coils wherein the coils lower the temperature of the ambient air from the ambient air inlet;
    the plurality of interconnected channels further comprising a first shutoff valve, a second shutoff valve, and a third shutoff valve, the first shutoff valve positioned between the pump and the coils, the second shutoff valve positioned between the coils and the accumulator tank, and the third shutoff valve positioned between the pump and the chiller unit;

the plurality of interconnected channels further comprising a control valve positioned between the second shutoff valve and the third shutoff valve;

a gas turbine comprising an flue gas exhaust and an air inlet in communication with an electric power generator and the coils;

a steam generator, in communication with the flue gas exhaust of the gas turbine comprising a condensate inlet;

a steam turbine in communication with the steam generator and comprising a steam extraction;

a second electric power generator operatively connected to the steam turbine;

a condenser in communication with the steam turbine; and a second pump in communication with the condenser and the condensate inlet of the steam generator.

8. The electric energy storage system of claim 7, the accumulator tank having a charging cycle and a discharging cycle.

9. The electric energy storage system of claim 8, wherein when the accumulator tank is in the charging cycle the first shutoff valve and the second shutoff valve are closed and the third shutoff valve is open and when in the discharging cycle the third shutoff valve is closed and the first shutoff valve and the second shutoff valve are open.

10. The electric energy storage system of claim 7, wherein the accumulator tank is insulated with thermal insulation.

11. The electric energy storage system of claim 7, wherein the chiller unit is driven by an electric motor.

12. The electric energy storage system of claim 7, wherein the chiller unit is an absorption chiller.

13. The electric energy storage system of claim 12, wherein the steam extraction of the steam turbine is in communication with the chiller unit.

14. A method for storing electric energy, comprising the steps of:

a. circulating fluid at a first temperature within a plurality of interconnected channels through a chiller unit and into an accumulator tank wherein the fluid is lowered to a second temperature by the chiller unit, wherein the interconnected channels includes a first shutoff valve, a second shutoff valve, and a third shutoff valve, the first shutoff valve positioned between the pump and the coils, the second shutoff valve positioned between the coils and the accumulator tank, and the third shutoff valve positioned between the pump and the chiller unit, and a control valve positioned between the second shutoff valve and the third shutoff valve;

b. circulating the fluid at the second temperature within the plurality of interconnected channels from the accumulator tank through a plurality of coils surrounded by compressor inlet air, such that the fluid at the second temperature lowers a temperature of the ambient air on the outside of the coils; and c. drawing the ambient air into a gas turbine through an air inlet.

15. The method for storing electric energy of claim 14, further comprising the steps, of expelling the flue gas from the gas turbine to a steam generator, wherein the steam generator uses the hot flue gas to convert water into steam; and then using the steam to power a steam turbine, which is driving a second electric power generator.

16. The method for storing electric energy of claim 15, further comprising the steps, of drawing steam from the steam turbine to a condenser, where the steam is condensed into condensate, and then pumping the condensate into a condensate inlet of the steam generator.

17. The method for storing electric energy of claim 15, further comprising the step, of drawing steam from the steam turbine to the chiller unit to be used as a heating medium in an absorption chiller.

18. The method for storing electric energy of claim 14, further comprising the step, using a wet compression process, such that water is sprayed into a gas turbine compressor to increase mass flow and lower the temperature of the compressor air by latent heat of evaporation process.

* * * * *